United States Patent [19]

McManigal

[11] 4,218,751
[45] Aug. 19, 1980

[54] ABSOLUTE DIFFERENCE GENERATOR FOR USE IN DISPLAY SYSTEMS

[75] Inventor: David F. McManigal, Stormville, N.Y.

[73] Assignee: International Business Machines Corporation, Armonk, N.Y.

[21] Appl. No.: 18,010

[22] Filed: Mar. 7, 1979

[51] Int. Cl.² .................................................. G06F 7/50
[52] U.S. Cl. ..................................... 364/784; 340/739; 364/785
[58] Field of Search ............... 364/784, 785, 786, 768; 340/739, 740, 741, 742

[56] References Cited

U.S. PATENT DOCUMENTS

| | | | |
|---|---|---|---|
| 3,459,926 | 8/1969 | Heilweil et al. | 340/739 X |
| 3,725,897 | 4/1973 | Bleiweiss | 340/741 |
| 3,816,734 | 6/1974 | Brendzel | 364/785 |

OTHER PUBLICATIONS

"Tektronix 4014, 4014-1, 4015 and 4015-1, Computer Display Terminal Service Instruction Manual" by Tektronix, Inc., Beaverton, Or. FIG. 6-27, 1974.

Primary Examiner—David H. Malzahn
Attorney, Agent, or Firm—Edward S. Gershuny

[57] ABSTRACT

An absolute difference generator comprises an adder, an Exclusive-OR, two inverters and a latch. One input number is inverted, then presented to one input of the adder while the other input number is presented to the other input of the adder. The carry out line of the adder sets a latch, the output of which is fed back to the carry in line of the adder. The latch output is also combined with the adder output in an Exclusive-OR to control inversion of the adder output and produce the absolute difference between the input data.

7 Claims, 3 Drawing Figures

4,218,751

ABSOLUTE DIFFERENCE GENERATOR FOR USE IN DISPLAY SYSTEMS

INTRODUCTION

This invention relates to display systems, especially vector generating display systems. More particularly, the invention relates to a mechanism for generating the absolute difference between two quantities which represent the ordinates or the abscissas of the two ends of a vector.

In computer controlled vector graphic systems, it is common to use vector display controls which are driven by signals representing absolute screen coordinate values. The typical vector display controls will obtain vector dimensions in terms of absolute differences between starting and ending coordinate values for each vector. For this reason, the typical vector display controls will include apparatus for generating the absolute difference between two numerical values.

A commonly used prior art absolute difference generator comprises an adder, a comparator and two Exclusive-OR circuits. The smaller of the two input numbers (as determined by the comparator) is inverted by one of the Exclusive-OR circuits and the absolute difference between the two input numbers is then generated in a single pass through the adder.

SUMMARY OF THE INVENTION

In accordance with a preferred embodiment of this invention, an absolute difference generator comprises an adder, an Exclusive-OR circuit, two inverters and a latch. One of the input numbers is inverted, then presented to one input of the adder while the other input number is presented to the other input of the adder. The carry out line of the adder is used to set a latch to indicate whether or not the lesser of the two input numbers was inverted. The output of the latch is fed back to the carry in line of the adder, and the latch output is also combined with the adder output in an Exclusive-OR circuit to control inversion of the adder output and produce the absolute difference between the input data. With this invention, the adder is used in two sequential steps.

The advantages of this invention stem from its elimination of comparator circuits. Although other circuit elements are added (for example, the inverters) there is a significant net saving in circuit cost. Although the absolute difference generator of this invention may have more circuit delays than difference generators used in the prior art, the delays will not have a significant effect upon performance of the system.

BRIEF DESCRIPTION OF DRAWINGS

In the accompanying drawings forming a material part of this disclosure.

DETAILED DESCRIPTION

For further comprehension of the invention, and of the objects and advantages thereof, reference will be had to the following description and accompanying drawings, and to the appended claims in which the various novel features of the invention are more particularly set forth.

This invention is primarily intended for use in a vector graphics display system. More particularly, it is intended for use in a system in which vectors are defined by the coordinates of their end points and the lengths of the vectors are calculated from those coordinates.

Figure 1:
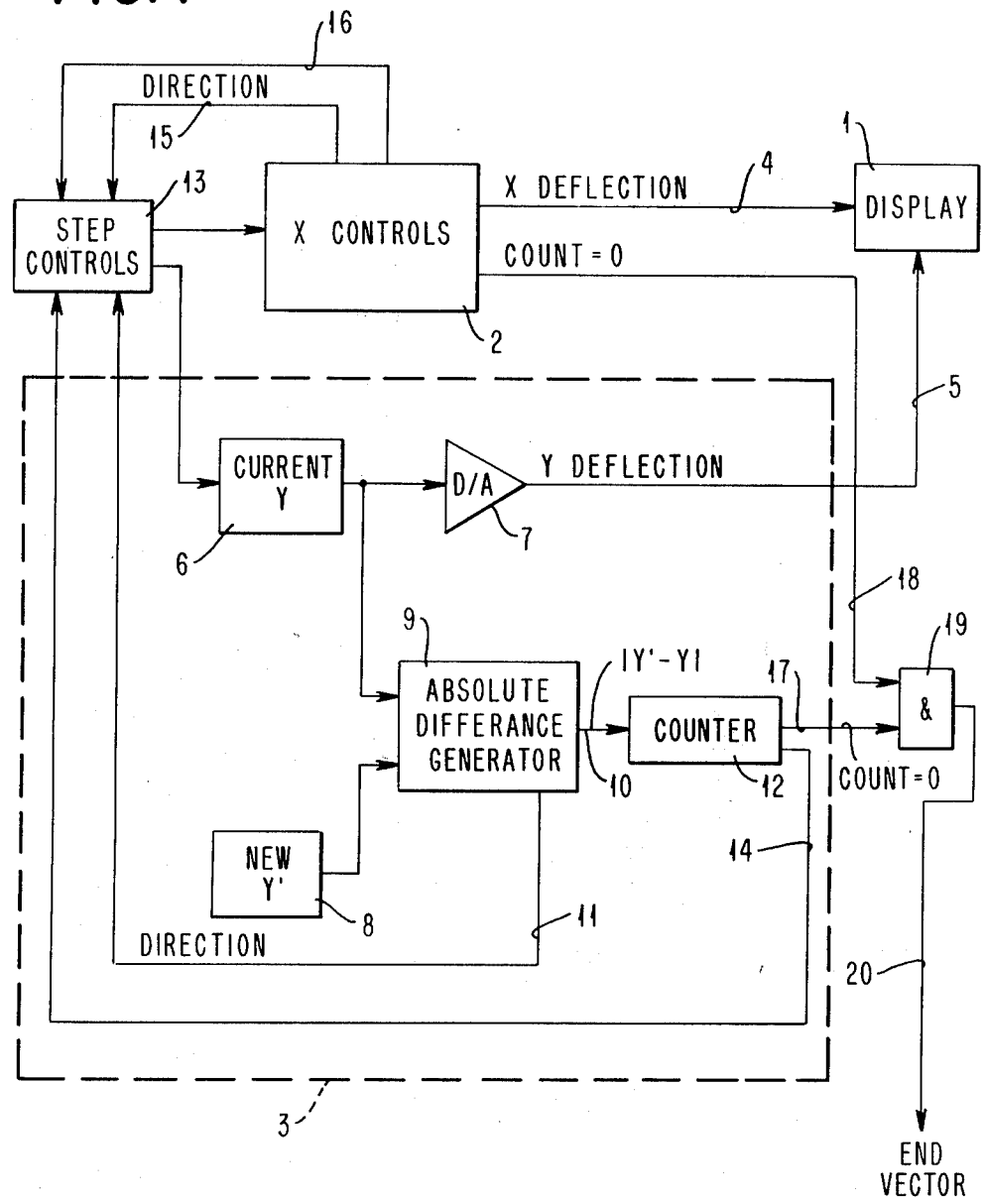
FIG. 1 is a schematic block diagram of an environmental system in which this invention may be used advantageously.

FIG. 1 presents a schematic block diagram of such a system. It includes a display apparatus 1 upon which vector graphic displays may be viewed. This display may be, for example, a direct view storage tube (DVST). To control the location of the beam on the display 1, signals are developed in X deflection controls 2 and Y deflection controls 3 and transmitted to the display, on X deflection line 4 and Y deflection line 5, respectively. Each of the deflection control units 2 and 3 is essentially identical to the other. Only the Y deflection controls are shown in detail in FIG. 1.

A steppable register 6 holds the current ordinate position of the display beam and, as it is stepped, is used to drive the beam in the Y direction through a digital to analog converter 7. In this explempary environmental system, there is a register 8 which holds a new ordinate value Y' to which it is desired to drive the display beam. The current and new values held in registers 6 and 8 are presented to an absolute difference generator 9 which generates the absolute difference between Y and Y' on line 10 and also generates a signal on line 11 to indicate in which direction the beam will have to be driven to go from ordinate Y to ordinate Y'.

The absolute difference between Y and Y' is used to initialize a counter 12, an output of which is presented to logical step controls 13 via line 14. The direction indicating signal on line 11 is also presented to the logical step controls 13.

When the graphic display system is in operation, the magnitude signal on line 14 and the direction signal on line 11 are both transmitted to the logical step controls 13. Also, from the X deflection controls 2, signals representing X-axis magnitude and direction are transmitted via lines 15 and 16 to the step controls 13. The logical step controls 13 contain an implementation of an algorithm for varying the abscissa and the ordinate of the display beam in dependence upon the relative magnitudes of the absolute differences between X and X' and between Y and Y' so as to draw a smooth vector in the direction determined by signals on lines 11 and 15. Each time that the current Y register 6 is stepped to move the display beam in the Y direction, counter 12 will be decremented. Similarly, each time that a current X register in the X deflection controls 2 is stepped, a corresponding counter will be decremented. When counter 12 reaches zero, this will be an indication that Y motion of the display beam has been completed for this vector. When the corresponding counter in the X deflection controls 2 reaches zero, this will indicate that X motion of the display beam has been completed. When both counts have been decremented to zero, signals on lines 17 and 18 will cause AND circuit 19 to produce a signal on line 20 indicating that the display of the vector has been completed. This signal will be transmitted to the source of vector data (which typically might be an electronic data processing system) which will subsequently transmit the coordinates of the next end point of a vector. These coordinates will be transmitted to register 8 and to a corresponding register in the X deflection controls 2.

One way to decrement counter 12 (and a corresponding counter in the X deflection controls 2) is to utilize the signals from the logical step controls 13. Each time that the current Y register 6 is stepped, the same control signal would be utilized to decrement counter 12. In another implementation, decrementing of the counter could be accomplished by generating a new absolute difference in absolute difference generator 9 each time the current Y register 6 is stepped. (With the latter implementation, counter 12 could be eliminated. Line 10 could be fed directly to AND 19.) Using this technique, the counter would contain a zero when current Y register 6 had been stepped to contain the same number as new Y' register 8. The mechanism for stepping counter 12 can be implemented in any desired manner and does not form a part of this invention.

The environmental system of FIG. 1 is presented solely as an example of an environment which this invention is advantageously used. Implementation details of the environmental system may be varied as desired in order to accommodate other aspects associated with any given display system.

Figure 2:
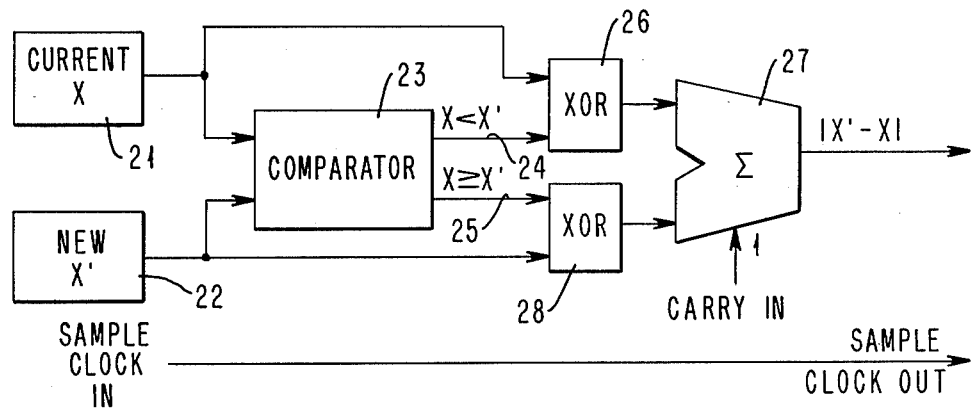
FIG. 2 is a schematic block diagram illustrating the prior art.

FIG. 2 shows a typical prior art implementation of an absolute difference generator. A current value of the a abscissa X is held in a register 21 and the next desired abscissa X' is held in a register 22. X and X' define the abscissas of the starting and ending points, respectively, of a vector. Another pair of registers (not shown) would define the staring and ending ordinates Y and Y' of the same vector. The contents of registers 21 and 22 are fed to a comparator 23. IF X is less than X', the comparator will generate a signal on line 24. If X is greater than or equal to X', the comparator will generate a signal on line 25. The contents of registers 21 and 22 are each fed to an Exclusive-OR (XOR) circuit. If X is less than X', the signal on line 24 will cause XOR 26 to complement (invert) the initial abscissa X before it is transmitted to adder 27. If X is greater than or equal to X', a signal on line 25 will cause XOR 28 to complement the ending abscissa X' prior to its transmission to adder 27. The outputs of XORs 26 and 28 are transmitted to the two inputs of adder 27, which also receives a 1 signal on its Carry In line, where they are added together. Since the number that was complemented is less than or equal to the number that was not complemented prior to addition, the result of the addition will be the absolute magnitude of the difference between X and X'. Thus, the prior art absolute difference generator shown in FIG. 2 uses a comparator 23 to determine which of the numerical inputs, X or X', is lesser in magnitude, uses the comparator outputs along with XOR circuits to complement the lesser value, then adds this complemented value to the other uncomplemented value (along with the Carry In signal which normally results from this type of complement addition) to generate the magnitude of the difference between the two input values.

XORs 26 and 28 have been indicated here to be Exclusive-OR circuits. However, those skilled in the art will recognize that each of those elements as described herein serves the function of a selective inverter which, depending upon the presence or absence of a signal on one of its input lines (line 24 for XOR 26 or line 25 for XOR 28) will invert or not invert a data signal appearing at its other input. Any mechanism which provides this function could be used as the XORs in the drawing.

Clocking for the absolute difference generator of FIG. 2 provided by a Sample Clock In signal which, after delays (not shown) within the generator, provides a Sample Clock Out signal to be utilized in other parts of the system (e.g., the counter 12 shown in FIG. 1).

Figure 3:
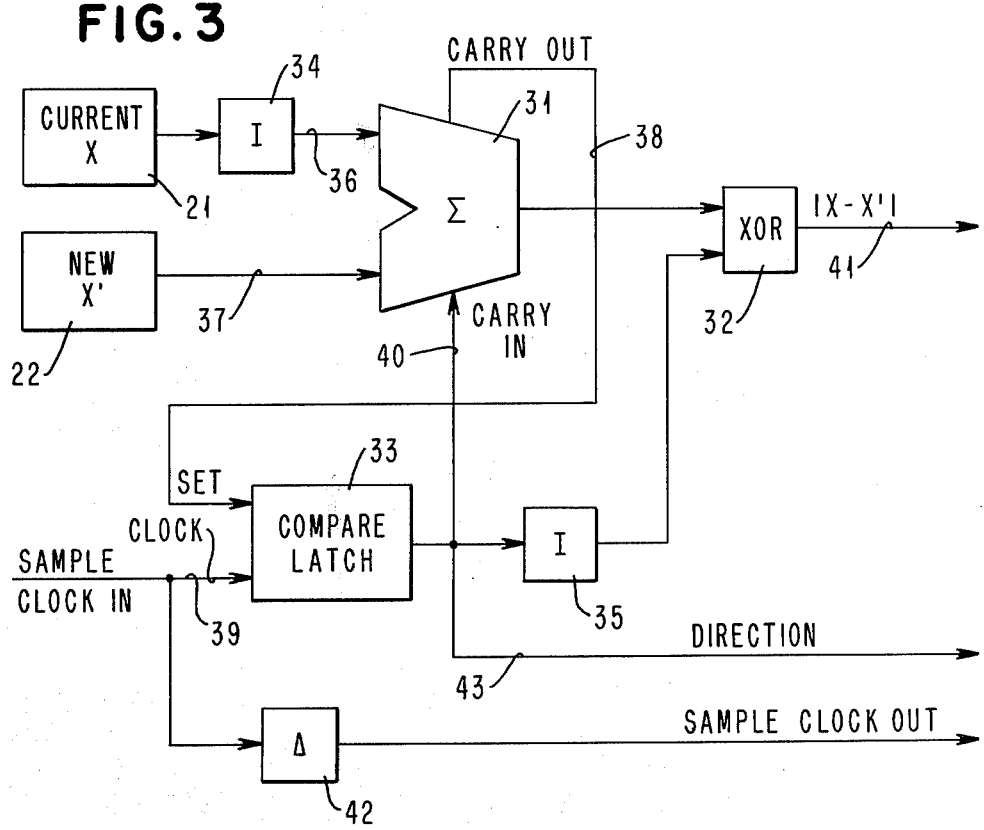
FIG. 3 is a schematic block diagram showing the preferred embodiment of the invention.

FIG. 3 is a schematic block diagram of the preferred embodiment of the invention. Inputs to the absolute difference generator may be provided by register 21 holding the current (initial) abscissa of the display beam and register 22 holding the next (final) desired abscissa of the display beam. The preferred embodiment of the invention comprises an adder 31, an XOR circuit 32, a compare latch 33 and inverters 34 and 35.

Inverter 34 receives the initial abscissa from register 21 and inverts it prior to presenting it to adder 31 on line 36. The final abscissa position X' is presented directly to the other input of adder 31 via line 37. The Carry Out line 38 of adder 31 feeds the Set input of compare latch 33 which is clocked via line 39. Latch 33 will be set if it receives a Carry Out signal at the same time that it receives a clock signal. The Carry Out signal will be generated if X was less than X'. The output of compare latch 33 is subsequently fed back to adder 31 via the adder Carry In line 40, thus providing the appropriate binary correction after the complement-add operation when initial abscissa X is less than final abscissa X'. In this case, the output of adder 31 will correctly represent the absolute value of the difference between X and X'. The output of compare latch 33 is inverted by inverter 35 so, in this case, the output of adder 31 will not be inverted by XOR 32.

If X is not less than X', then the addition performed in adder 31 will not result in a Carry Out signal on line 38, and compare latch 33 will not be set. Therefore, there will be no binary correction (there will be no signal on Carry In line 40) and the output of compare latch 33, after inversion by inverter 35, will cause XOR 32 to complement the output of adder 31. This will result in the correct representation of the magnitude of the difference between X and X' appearing on line 41.

The output of compare latch 33 can, in addition to the functions described above, provide a direction signal on line 43. (See lines 11 and 15 in FIG. 1 and the previous discussion thereof.)

Also shown in FIG. 3 is a delay element 42 between the Sample Clock In and the Sample Clock Out signals. This is shown so it will be absolutely clear that the clock signal which will be used for timing the utilization of the absolute difference between X and X' (for example, gating it into counter 12 shown in FIG. 1) must be delayed by a sufficient amount to ensure that the correct value is present on the output line 41 of XOR 32. This amount will be equal to the maximum circuit delays introduced by the circuit elements in the absolute difference generator.

As was mentioned above, there can be many different implementations for the XOR 32. In the preferred embodiment, XOR 32 is implemented as a bank of Exclusive-OR circuits equal in number to the number of lines coming from adder 31. The output of inverter 35 is fed to one input of each of the Exclusive-OR circuits so that it can invert each bit of the output from adder 31.

The absolute difference generator shown in FIG. 3 will be replicated in an environmental system such as the one shown in FIG. 1. There will be one absolute difference generator for horizontal vector displacement and one absolute difference generator for vertical vector displacement. If desired, a single set of controls including a single absolute difference generator could be shared between vertical and horizontal controls. However, because of the circuit complexity and cost that would result, this alternative will generally not be desirable.

Those skilled in the art will recognize that the input registers 21 and 22 shown in FIG. 3 merely represent one mechanism by which a stable input signal can be presented to the absolute difference generator. In place of input registers 21 and 22, other registers (for example, at the output of adder 31) could be provided. Those skilled in the art will further recognize that the decision to invert current X was arbitrary. New X' could have been inverted instead without affecting the invention or its use.

The preferred implementation of this invention described herein and shown in FIG. 3 is partially dependent for its utility upon a system implementation in which all of the input abscissas and ordinates are expressed as positive numbers. The implementation shown in FIG. 3, if utilized in a system which permits both positive and negative coordinates, will not produce correct results in all cases. If both of the input numbers (e.g., X and X') are positive, or if they are both negative, the system shown in FIG. 3 will produce a correct absolute difference. However, if one of the input numbers is positive and the other is negative, the system shown in FIG. 3 will produce the two's complement of the correct absolute difference. Therefore, if this invention were to be used in such a system, additional circuitry would need to be added. Perhaps the simplest way to add the additional circuitry would be to provide means for recognizing that the two input quantities have different signs and to use that recognition to inhibit the inversion provided by inverter 34. The absolute difference generator would then function exactly as described above. However, since the primary advantage of this invention over the prior art is that it eliminates some circuitry, those skilled in the art will understand that this invention probably would not be used in such a system.

The essential elements of this invention, each of which can be implemented in a variety of ways, are a mechanism for complementing a predetermined one of the numerical inputs, a mechanism for adding the complemented input and the true input, and a mechanism for using the results of the addition to control selective complementing of the result of the addition.

While a preferred embodiment of the invention has been illustrated and described, it is to be understood that the invention is not limited to the precise construction herein disclosed and the right is reserved to all changes and modifications coming within the scope of the invention as defined in the appended claims.

Having thus described our invention, what we claim as new, and desire to secure by Letters Patent is:

1. For use in a vector graphic display system, a mechanism for generating an indication of the absolute difference between first and second input quantities comprising:
    first complementing means for complementing the first input quantity;
    adding means having one input connected to the output of said complementing means and another input connected to the second input quantity;
    indicating means responsive to the output of said adding means to indicate whether the first input quantity was less than the second input quantity; and
    second complementing means responsive to the joint outputs of said indicating means and said adding means to complement the output of said adding means if the first input quantity was not less than the second input quantity.

2. The absolute difference generator of claim 1 wherein said indicating means has its output connected to a third input of said adding means in order to provide a binary correction bit to the sum produced by said adding means.

3. The absolute difference generator of claim 1 or claim 2 wherein the output of said indicating means is inverted prior to connection to the input of said second complementing means.

4. The absolute difference generator of claim 1 or claim 2 wherein:
    the output of said indicating means is utilized to indicate the direction in which a vector is to be drawn on said display system.

5. The absolute difference generator of claim 3 wherein:
    the output of said indicating means is utilized to indicate the direction in which a vector is to be drawn on said display system.

6. In a process for generating a vector graphic display, a process for generating an indication of the absolute difference between first and second input quantities comprising the steps of:
    complementing the first input quantity;
    adding the complemented first input quantity to the second input quantity;
    indicating whether the first input quantity was less than the second input quantity; and
    complementing the result of said addition step if the first input quantity was not less than the second input quantity.

7. The method of claim 6 further including the step of using the result of said indicating step to provide a binary correction to the sum produced by said adding step.

* * * * *

UNITED STATES PATENT AND TRADEMARK OFFICE
CERTIFICATE OF CORRECTION

PATENT NO. : 4,218,751
DATED : August 19, 1980
INVENTOR(S) : D. F. McManigal

It is certified that error appears in the above-identified patent and that said Letters Patent are hereby corrected as shown below:

Column 5, line 36, the phrase "inhibit the inversion provided by inverter 34." should read --invert the carry out signal on line 38.--

Signed and Sealed this

Eleventh Day of November 1980

[SEAL]

Attest:

SIDNEY A. DIAMOND

Attesting Officer

Commissioner of Patents and Trademarks